United States Patent [19]

Sugiyama

[11] 3,805,616
[45] Apr. 23, 1974

[54] TEMPERATURE MEASURING APPARATUS
[75] Inventor: Takashi Sugiyama, Tokyo, Japan
[73] Assignee: Yokogawa Electric Works, Ltd., Tokyo, Japan
[22] Filed: Mar. 25, 1971
[21] Appl. No.: 128,093

[30] Foreign Application Priority Data
Apr. 21, 1970  Japan............................. 45-34119

[52] U.S. Cl.................... 73/362 AR, 324/62
[51] Int. Cl...................... G01k 7/20, G01r 27/14
[58] Field of Search............. 73/362 AR; 324/62 R

[56] References Cited
UNITED STATES PATENTS

| | | | |
|---|---|---|---|
| 1,411,396 | 4/1922 | Wilson et al. | 73/362 AR X |
| 2,191,765 | 2/1940 | Lohman | 73/362 AR |
| 3,651,696 | 3/1972 | Rose | 73/362 AR |
| R27,103 | 3/1971 | Cate | 73/362 AR UX |
| 3,447,075 | 5/1969 | Williams et al. | 73/362 AR X |
| 3,531,990 | 10/1970 | Shinskey | 73/362 AR X |

Primary Examiner—S. Clement Swisher
Assistant Examiner—Frederick Shoon
Attorney, Agent, or Firm—Bryan, Parmelee, Johnson & Bollinger

[57] ABSTRACT

A temperature-measuring system of the type wherein the sensing element is an electrical resistor connected by three leads to a measuring circuit. Two of the leads connect the resistor as a feedback element around an operational amplifier supplied at its input with a constant current. The third lead connects to a constant current source to produce through the other two leads current flows which are equal but opposite in direction, so as to minimize measurement errors when the lead resistances change with environmental effects such as ambient temperature and the like.

13 Claims, 5 Drawing Figures

TEMPERATURE MEASURING APPARATUS

BACKGROUND OF THE INVENTION

1. Field of the Invention

This invention relates to resistance-measuring apparatus used for example to measure temperature inferentially at a remote location. More specifically, this invention relates to a system wherein a resistance sensing element, sometimes in the form of a so-called resistance bulb, is placed in a region the temperature of which is to be measured, and is connected by leads to a distant resistance measuring circuit arranged to produce an electrical output signal representing the temperature of interest.

2. Description of the Prior Art

Resistance thermometry has been used for many years to measure temperatures at distant locations, and a wide variety of circuits have been devised to obtain results of appropriate accuracy. One of the important problems with such systems has been the effect on measurement results of changes in resistance of the connecting leads, such as due to changes in ambient temperature in the region through which the leads pass. To minimize such errors, a number of different compensating circuits have been devised based on the use of additional leads connected between the sensing element and the measuring circuit. This has led to the use of three-lead systems and, for still better accuracy, four-lead systems.

SUMMARY OF THE INVENTION

This invention provides a resistance thermometry system wherein high accuracy can be achieved with three-lead interconnecting circuitry for the resistance bulb. This result is effected by using one lead to control the magnitude and direction of currents flowing through the other two leads, such that changes in resistance of the other leads produce equal but opposite-polarity changes in voltage drop in those leads.

Accordingly, it is an object of this invention to provide improved resistance-measuring apparatus especially adapted to measure the resistance of a temperature-responsive element. A more specific object of the invention is to provide such a measuring system of the three-lead type having superior accuracy, and yet capable of economical manufacture.

DESCRIPTION OF PREFERRED EMBODIMENTS

Figure 1:
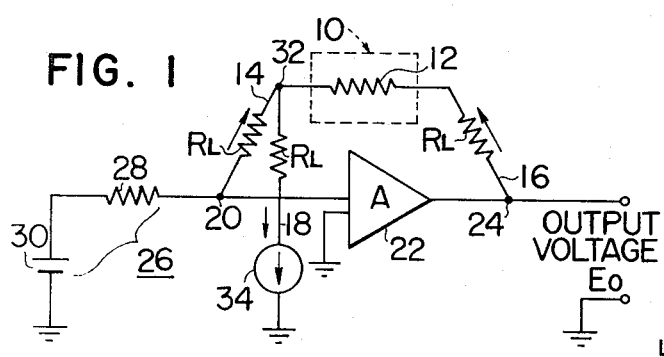
FIG. 1 is a schematic diagram illustrating one embodiment of the invention.

Referring first to FIG. 1, the temperature measuring system shown there includes a resistance bulb 10 incorporating a resistor element 12 suited for making desired temperature measurements. This bulb 10 is furnished with three connecting leads 14, 16, 18, conventionally of equal length and identical characteristics, i.e. the leads are constructed of the same material and of the same size, and hence have identical electrical resistance characteristics $R_L$.

The first lead 14 connects one end of the resistance element 12 to one input terminal 20 of an operational amplifier 22 the output voltage of which represents the temperature being measured. The second lead 16 connects the other end of the element 12 to an output terminal 24 of the amplifier thereby to establish a negative feedback circuit through the resistance element 12. A source of current 26, comprising an input resistor 28 and a constant voltage source 30, furnishes current of a constant magnitude to the amplifier input. By virtue of the negative feedback action, essentially all of this current passes into the first lead 14 and, if no other circuit elements were involved, the current normally would pass through element 12 and the second lead 16 to the amplifier output.

To minimize the effect of changes in resistance of leads 14 and 16 on the amplifier output voltage, the third lead 18 is connected from the junction 32, at the left-hand end of element 12, to a source of constant current 34. This source is adjusted to draw current from junction 32 in an amount equal to twice the magnitude of current produced by the input source 26. With such an arrangement, it will be evident that the current flowing through the second lead 16 will be exactly equal in magnitude to the current passing through the first lead 14, but of opposite polarity (direction), as indicated by the arrows. The output voltage $E_o$ therefore will be equal to the voltage across the resistor element 12, and will be unaffected by the voltage drops in the leads.

When there is a change in resistance of leads 14 and 16, due for example to a change in ambient temperature surrounding the leads, there will be corresponding equal changes in voltage drop in those leads. Since the currents pass through those leads in opposite directions, the changes in voltage drop will be of opposite polarity with respect to the voltage across the resistance element 12. Hence, there will be no net change in voltage at the amplifier output. It may also be noted that any change in resistance of the third lead 18 has no effect on the measurement, because the source 34 maintains the current through lead 18 constant regardless of such resistance changes.

In the event that the resistances of the first and second leads 14 and 16 are unequal, the system can be made to function with desired precision by setting the current of source 34 to a level different from twice the current applied to the amplifier input, by a factor related to the relative resistances of the first and second leads. It may also be noted that if the current produced by source 26 changes, a corresponding change should be made in the current produced by the other source 34. That is, the two current sources should track, such that they produce corresponding currents at all times. Preferably, this result is achieved by maintaining both currents constant, as in the preferred embodiment described herein, since this avoids the need for calibration compensation.

When using a resistance element 12 of a conventional construction, the change in bulb resistance (and hence output voltage) typically will be non-linear with respect to changes in temperature. For example, the relationship between the bulb resistance $R_t$ and temperature may be expressed as:

$$R_t = R_o (1 + at + bt^2)$$

where $R_o$ = bulb resistance value at a reference temperature $a$, $b$ are constants, and $t$ = temperature deviation from the reference temperature.

Figure 2:
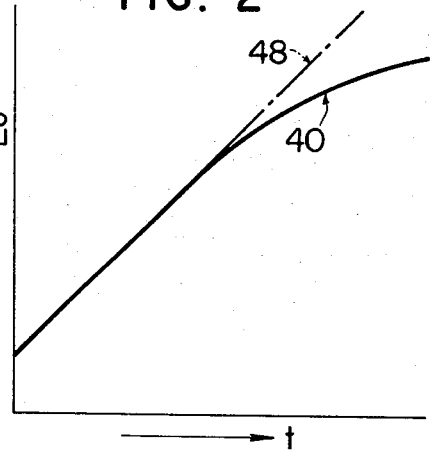
FIG. 2 is a graph showing the non-linear characteristic of one typical resistance bulb.
Figure 3:
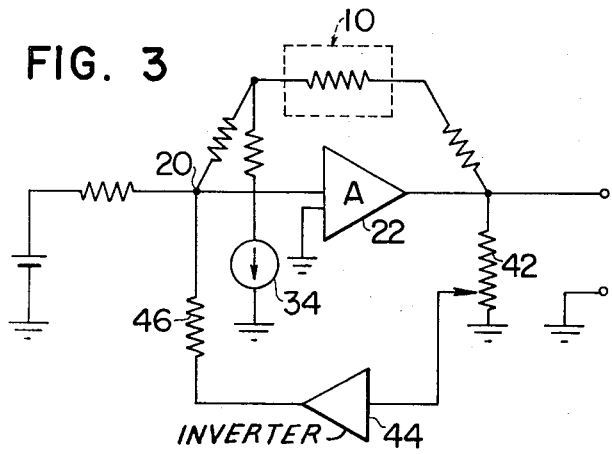
FIG. 3 shows a modified circuit providing compensation for the non-linearity of FIG. 2.

With a metal resistor element such as platinum, the constant $b$ is negative, and the variation of output voltage with temperature is illustrated (in exaggerated form) in FIG. 2 by the curve 40. To linearize this relationship, the arrangement of FIG. 3 may be used. In this embodiment, positive feedback is provided by means including a voltage-dividing potentiometer 42 in the output of the amplifier. This potentiometer produces a signal which is directed through an inverter 44 and a series resistor 46 to the amplifier input.

Experiments with apparatus as shown in FIG. 1, using a platinum resistor element 12 in the temperature range of 0° to 500°C, indicated a non-linearity (i.e. a deviation from linearity) of 8 percent maximum. With the FIG. 3 compensating arrangement, the non-linearity was reduced to only 0.2 percent, illustrated approximately by straight line 48 on the graph of FIG. 2, with the voltage divider 42 set at 4 percent (25 : 1 ratio).

Figure 4:
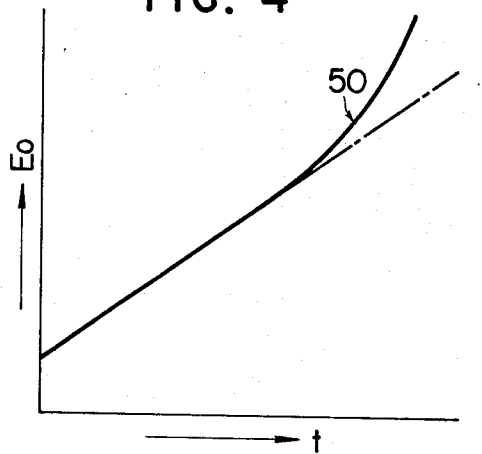
FIG. 4 is a graph showing the non-linear characteristic of another resistance bulb element.
Figure 5:
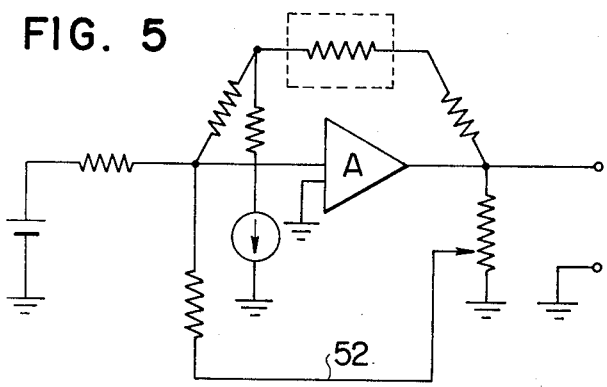
FIG. 5 shows another modified circuit providing compensation for the non-linearity of FIG. 4.

In some resistance bulbs, the constant $b$ may be positive such that a non-linearity as illustrated at curve 50 (FIG. 4) may result. In that event, the compensation to achieve linearization will include negative feedback means, as illustrated at 52 in FIG. 5.

It should be understood that specific preferred embodiments are described hereinabove for the purpose of explaining the nature of the invention, and are not necessarily limitative of the invention, since many modifications will be apparent to those skilled in the art for adapting the invention to different applications.

I claim:

1. In a temperature measuring system wherein the resistance of a sensing resistor is measured to produce an output signal corresponding to the sensed temperature; the improvement comprising the combination of:
   an amplifier;
   first and second leads respectively connecting the terminals of said sensing resistor to the input and output of said amplifier to form a negative feedback circuit through the sensing resistor and the leads around the amplifier;
   first current-producing means connected to the input of said amplifier to cause a corresponding flow of current through the one of said leads connected to said input; and
   second current-producing means producing a greater magnitude of current than the first current-producing means and connected to said negative feedback circuit intermediate said leads and with a direction of flow relative to said feedback circuit opposite to that of the first current-producing means to cause a current to flow through the other lead in a direction opposite to the current flowing through said one lead, whereby the voltages across said two leads tend to cancel and the effect of changes in resistance of said two leads on the amplifier output signal tends to be nullified.

2. A system as claimed in claim 1, wherein said sensing resistor is of the type having three leads of equal resistance;
   said first lead being connected between one end of said resistor and said amplifier input;
   said second lead being connected between the other end of said resistor and said amplifier output; and
   said third lead being connected between said one resistor end and said second current-producing means.

3. A system as claimed in claim 2, wherein said first and second current-producing means maintain corresponding output currents.

4. A system as claimed in claim 3, wherein said second current-producing means produces a current of twice the magnitude of the current produced by said first current-producing means.

5. A system as claimed in claim 4, wherein said current-producing means are constant current sources.

6. A system as claimed in claim 1, including second feedback means connected between the output and input of said amplifier to linearize the changes in output signal with changes in temperature.

7. A system as claimed in claim 6, wherein said second feedback means provides negative feedback.

8. A system as claimed in claim 6, wherein said second feedback means provides positive feedback.

9. In a resistance measuring system wherein a resistor is measured to produce an output signal corresponding to the resistance of the resistor, the improvement comprising the combination of:
   an amplifier;
   first and second leads respectively connecting the terminals of said resistor to the input and output of said amplifier to form a negative feedback circuit through the resistor and the leads around the amplifier;
   first current-producing means connected to the input of said amplifier to cause a corresponding flow of current through the one of the leads connected to said input; and
   second current-producing means producing a greater magnitude of current than the first current-producing means and connected to said negative feedback circuit intermediate said leads and with a direction of flow relative to said feedback circuit opposite to that of the first current-producing means to cause a current to flow through the other lead in a direction opposite to the current flowing through said one lead, whereby the voltages across said two leads tend to cancel and the effect of changes in resistance of said two leads on the amplifier output signal tends to be nullified.

10. A system as claimed in claim 9 wherein the resistor is of the type having three leads of equal resistance;

said first lead being connected between one end of said resistor and said amplifier input;
   said second lead being connected between the other end of said resistor and said amplifier output; and
   said third lead being connected between said one resistor end and said second current-producing means.

11. A system as claimed in claim 10, wherein said first and second current-producing means maintain corresponding output currents.

12. A system as claimed in claim 11, wherein said second current-producing means produces a current of twice the magnitude of the current produced by said first current-producing means.

13. A system as claimed in claim 12, wherein said current-producing means are constant current sources.

* * * * *